United States Patent [19]

Ryan

[11] 4,404,499
[45] Sep. 13, 1983

[54] CIRCUIT FOR MINIMIZING EDGE HOOKING IN TELEVISION CAMERA PICKUP TUBES

[75] Inventor: John O. Ryan, Cupertino, Calif.

[73] Assignee: Ampex Corporation, Redwood City, Calif.

[21] Appl. No.: 248,919

[22] Filed: Mar. 30, 1981

[51] Int. Cl.³ ............................................. H01J 29/56
[52] U.S. Cl. .................................... 315/371; 315/403; 315/395
[58] Field of Search ............... 315/386, 384, 403, 395, 315/370, 371; 358/223

[56] References Cited

U.S. PATENT DOCUMENTS 3,755,707  8/1973  Fremont .............................. 315/386
3,857,059 12/1974  Larson ................................ 315/395
4,038,581  3/1983  Dorsey et al. ...................... 315/386

Primary Examiner—Theodore M. Blum
Attorney, Agent, or Firm—George B. Almeida; Joel D. Talcott

[57] ABSTRACT

Selected additional voltages are utilized to modify the respective horizontal and vertical sawtooth waveforms which generate the horizontal and vertical electron beam scans in a photoelectric tube. The added voltages are selectively applied during the respective horizontal and vertical blanking intervals, whereby the speed of the scan is doubled, tripled, etc., during the blanking intervals. Since the time available during blanking is still the same, increasing the speed of the beam scan causes the beam to scan correspondingly further into the non-scanned target portion. Thus, corresponding greater distances into the surrounding target are discharged which, in turn, circumvents charge bleeding into the active picture area, thereby precluding edge hooking.

11 Claims, 7 Drawing Figures

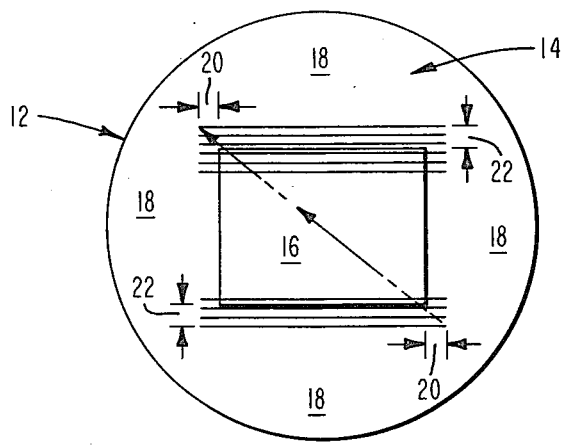
FIG_1
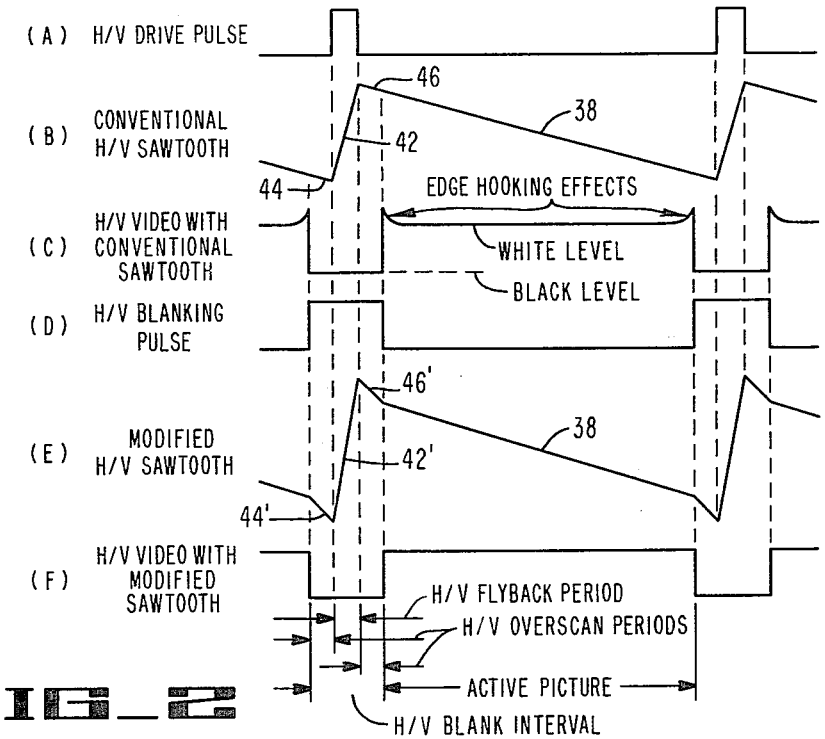
FIG_2
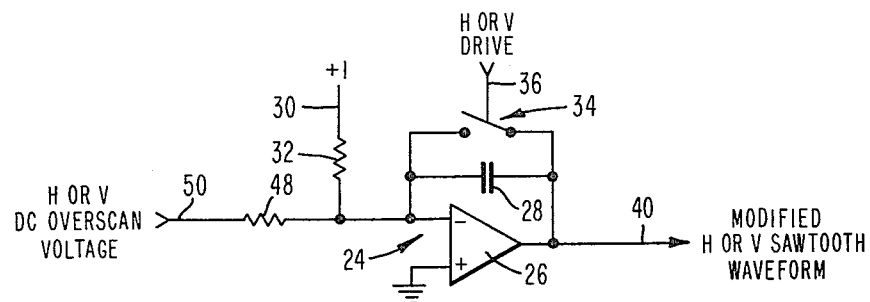
FIG_3

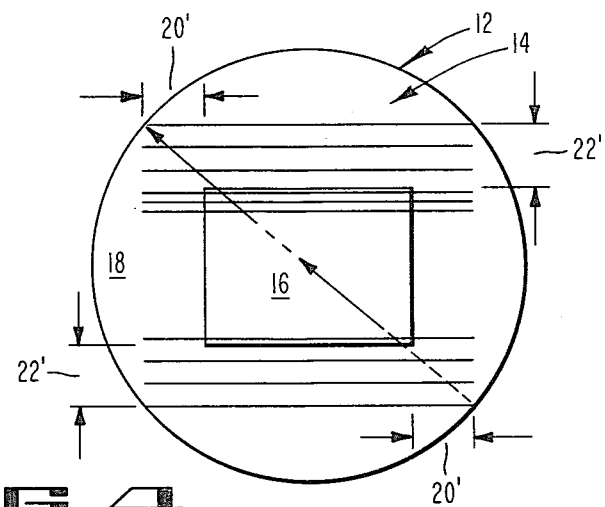
FIG_4
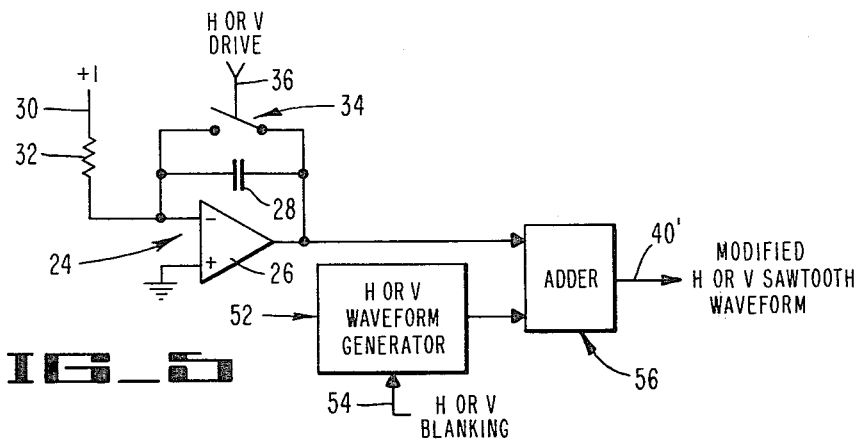
FIG_5
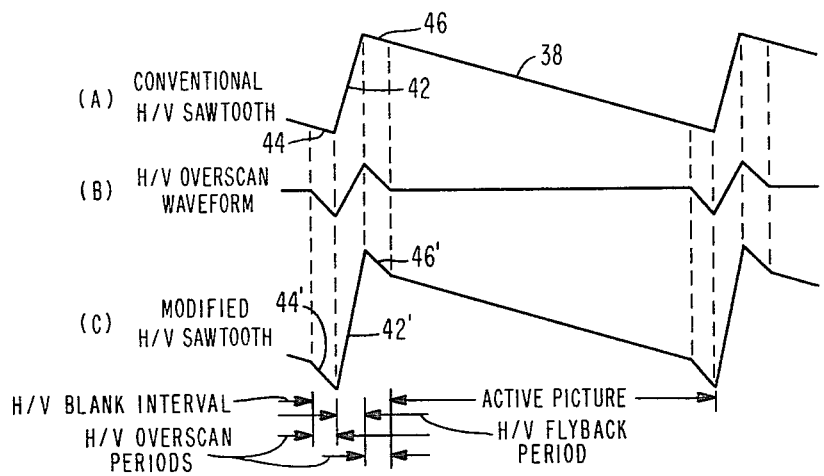
FIG_6
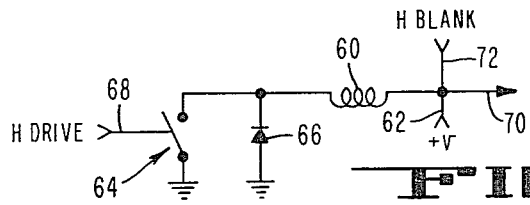
FIG_7

CIRCUIT FOR MINIMIZING EDGE HOOKING IN TELEVISION CAMERA PICKUP TUBES

BACKGROUND OF THE INVENTION

The invention relates to means for improving the geometry of the active picture area in a photoelectric tube, and in particular to means for circumventing the phenomenon known as "edge hooking" in television camera pickup tubes.

In photoelectric tubes, an electron beam scans a two-dimensional active picture area located within a surrounding non-scanned portion of the entire tube target. However, the entire target receives incident light, which accordingly, charges the entire backface of the target. Since the beam only reads out the active picture area, very large charge patterns remain in the surrounding non-scanned portion of the target. These charges bleed in the immediately adjacent active picture area, causing both horizontal and vertical "edge hooking," i.e., distortion along the top, bottom, left and right borders of the picture.

Some compensation for edge hooking is provided in the prior art by scanning the electron beam a small distance into the immediate boundaries surrounding the active picture area. This small distance, hereinafter termed "overscan," is determined by the velocity of the beam and the time available during the horizontal and vertical blanking intervals, immediately before and after the flyback period. The electron beam reads out, and thus discharges, a small boundary about the active picture area, corresponding to the overscan distance that the beam moves during the few microseconds available while traveling at normal scanning velocity. This in turn marginally decreases the amount of charge bleeding and thus edge hooking. However, edge hooking still persists and accordingly has been a constant problem in the design of television cameras.

SUMMARY OF THE INVENTION

The invention provides an extremely simple yet effective means for minimizing the above-described phenomenon of edge hooking common in prior art camera systems. To this end, an additional, selected voltage is applied to the conventional horizontal and vertical scan generating circuits, during all or selected portions of the respective horizontal and vertical blanking intervals. The additional voltage causes a corresponding substantial increase in the scan velocity of the electron beam during the corresponding blanking intervals. It follows that increasing the velocity over the same available time period causes the beam to scan a correspondingly increased distance into the previously non-scanned area of the target surrounding the active picture area. This in turn discharges the surrounding area an increased distance sufficient to prevent the occurrence of edge hooking in the picture, in both the horizontal and vertical directions.

The invention contemplates various means for implementing the generation of the added voltages, to cause the corresponding increase in the electron beam scan speed during the horizontal and vertical blanking intervals, as further described below.

Accordingly, it is an object of the invention to eliminate edge hooking by causing a selected increase in beam scanning velocity during the horizontal and vertical blanking intervals.

A further object is to apply selected DC voltages to the inputs of the horizontal and vertical sawtooth waveform generators of a camera pickup tube scan system during the blanking intervals, to correspondingly increase the scan velocity of the electron beam.

Another object is to apply horizontal and vertical blanking pulses to the inputs of the respective sawtooth waveform generators to cause the selective increase in electron beam velocity.

Still another object is to apply a voltage waveform of selected configuration to the horizontal and vertical sawtooth waveforms during the respective blanking intervals to increase the velocity of beam scan.

BRIEF DESCRIPTION OF THE DRAWINGS

FIG. 1 is a view of the faceplate, i.e., target area, of a photoelectric tube, wherein the manner of overscan performed in a prior art system is depicted in exaggerated scale.

FIGS. 2A–2F are graphs comparing typical waveforms generated by the prior art systems, with those waveforms generated by the invention combination.

FIG. 3 is a schematic diagram of one implementation of the invention technique as used with a sawtooth-generating integrator circuit.

FIG. 4 is a view similar to that of FIG. 1 depicting the increased overscan distance provided by the invention.

FIG. 5 is a schematic of an alternative embodiment of the invention combination.

FIGS. 6A–6C are graphs illustrating typical waveforms of the circuit of FIG. 5.

FIG. 7 is a schematic of a further embodiment of the invention as used with a less sofisticated sawtooth waveform generator.

DESCRIPTION OF THE PREFERRED EMBODIMENTS

Referring to FIG. 1, the faceplate of a photoelectric tube 12 is shown herein as a target 14 of the tube. The target is defined by an active picture area 16 surrounded by a non-active, i.e., non-scanned, target area 18. The active picture area 16 is scanned by an electron beam in two dimensions to generate, via the target, the video signal corresponding to the image provided by light incident on the active picture area 16. However, the entire target 14 receives incident light and is charged accordingly. Since the beam does not scan the non-scanned area 18, very large charge patterns remain, which bleed into the immediately adjacent portions of the active picture area 16. The result is distortion of the top, bottom, left and right edges of the video picture, which distortion is commonly known as horizontal and vertical "edge hooking."

The distortion from edge hooking is reduced somewhat by over-scanning the active picture area 16 small distances 20 in the horizontal direction, and small distances 22 in the vertical direction. The corresponding overscan distances thus are discharged to reduce the extent of charge bleeding into the active picture area. However, edge hooking still persists and the conventional video signal appears as shown, for example, in FIG. 2C. As may be seen, the signal current at the limits of the active picture are greater than white level, which causes distortion at the horizontal and vertical boundaries of the video picture.

To illustrate further, an example can be made with regards to the horizontal direction, i.e., horizontal hooking, and employing the PAL television standard. The active line time, corresponding to the active picture in the horizontal direction, is depicted in FIG. 2 and is 52 microseconds (μs) of a total line time of 64 μs. This leaves a horizontal blanking interval of 12 μs. The flyback period corresponding to the horizontal drive pulse (FIG. 2A) is about 5 μs. Thus there are about 7 μs available in the blanking interval during which overscan can be performed. If the output video is centered about the scan as shown in FIG. 2, then the beam may be overscanned about 3.5 μs at either side of the picture. The resulting overscan distance of previous mention (i.e., distance 20, FIG. 1) is then the distance the electron beam moves in 3.5 μs when scanning at its conventional scan velocity.

It is understood that the graphs of FIG. 2 also apply to the scanning process in the vertical direction, wherein several lines are scanned above and below the active-picture area 16, providing the overscan distance 22 in the vertical direction, at the top and bottom of the active area 16.

Such overscans provide minimal compensation for charge bleeding into the active picture area, whereby edge hooking persists.

In accordance with the invention, means is provided to utilize the 3.5 μs overscan periods, i.e., the overall horizontal and vertical blanking intervals, to provide significantly greater beam overscan distances into the non-scanned area 18. This in turn causes the discharge of the non-scanned area for proportionately greater distances from the boundaries of the active picture area 16. This prevents charge bleeding into the active picture area, and solves the problem of horizontal and vertical edge hooking.

More particularly, give the same 3.5 μs of horizontal overscan shown in FIG. 2, if the velocity of the electron beam is doubled, tripled, etc., for the same time period, then the distance it travels into the non-scanned area is correspondingly doubled, tripled, etc. In practice, the velocity of beam scan may be selectively increased almost without limitation during the entire horizontal and vertical blanking intervals, to provide significantly increased distances of overscan at the top, bottom, left and right sides of the picture.

To this end, FIG. 3 depicts a typical horizontal and/or vertical sawtooth waveform generator, illustrated here as a basic integrator circuit 24 formed of an operational amplifier 26 and capacitor 28. A positive voltage (e.g., 1 volt) is supplied to the negative input of the amplifier 26 via an input 30 and a resistor 32, wherein the latter determines the charging current. The positive input is grounded. Conventional reset switch means 34 are connected across the capacitor 28, and are driven by the conventional horizontal (H) or vertical (V) drive pulse (FIG. 2A) at drive line 36. The conventional horizontal or vertical sawtooth of FIG. 2B is provided at an output 40.

Conventionally, when the drive pulse of FIG. 2A is absent, the reset switch means 34 is open and the capacitor 28 charges to produce the linear ramp 38 of FIG. 2B at the output 40. The slope of the ramp 38 depends on; the value of the capacitor 28; the value of the resistor 32, and the value of the voltage at input 30. During the mid portion of the blanking interval, the drive pulse closes the reset switch means 34, shorting the capacitor 28 to ground, and generating the flyback ramp 42. As may be seen in FIG. 2B, the slope of the overscan portions 44, 46 of the ramp 38, are the same as that of ramp 38 during the blanking intervals.

In accordance with the invention, a resistor 48 is coupled from the negative input of the operational amplifier 26 to a selected DC overscan voltage at an input 50. The overscan voltage may be, for example, the H or V blanking pulse depicted at FIG. 2D, wherein the pulse is symmetrical about the H or V drive pulse of FIG. 2A. The current applied to the integrator circuit from input 50 is determined by the value of the resistor 48. Thus, the overscan voltage supplied at 50 is added to the conventional voltage supplied at 30 during the corresponding H or V blanking interval. It follows that the slope at the ramp portions 44, 46 and of flyback ramp 42, previously shown in FIG. 2B, and thus the velocity of the scan beam during the blanking interval, is increased correspondingly. The increase of velocity is depicted in FIG. 2E by ramp portions 44' and 46' at either side of the flyback ramp 42'. The ramp 42' also is depicted with a greater slope. Since the velocity of the beam is doubled, tripled, etc., during the blanking interval, it travels a corresponding increased distance into the (usually) non-scanned target area 18 during the overscan periods corresponding to the ramps 44', 46'.

By way of example only, if source 30 is 1 volt and resistor 32 is 1000 ohms, then the conventional charging current is 1 milliampere (ma) while reset switch means 34 is open, i.e., during the active picture scan interval. Since the input voltage at source 50 is zero during the active picture, the integrator circuit produces the conventional ramp 38 of FIG. 2B. If a velocity increase of four times normal is desired during the overscan periods, the value of resistor 48 is made 330 ohms, i.e., one-third the value of resistor 32, and the H or V blanking pulse is 1 volt. Thus in accordance with the invention, during the blanking interval an additional charging of 3 ma is added to the usual 1 ma current, for a total of 4 ma for charging current. As depicted in FIG. 2E, the result is a four-to-one increase in the slope of ramp portions 44', 46' and a corresponding increase in the scan velocity during the blanking interval. The result video signal with virtually no edge hooking is depicted in FIG. 2F.

Thus it follows that although the overscan time periods are the same as in the conventional system, the distance traveled by the beam during overscan is significantly increased, due to the selective increase of beam velocity. The horizontal and vertical increases are depicted in FIG. 4 by numerals 20' and 22'.

FIG. 5 depicts an alternate embodiment for increasing the beam velocity during the overscan periods, wherein like components are similarly numbered. Accordingly, the source 50 and resistor 48 are omitted, and waveform generator means 52 provides an additional complementary waveform during the H or V blanking interval in response to the H or V blanking pulses respectively, at an input 54. The output of the generator 52 is fed to adder means 56, which also receives the conventional sawtooth waveforms generated by the integrator circuit 24. FIG. 6A depicts the conventional sawtooth shown in prior FIG. 2B, and FIG. 6B depicts the added voltage waveform provided by the waveform generator means 52. The added waveform may be, for example, a sinewave whose negative excursion occurs during overscan period 44 and whose positive excursion occurs during overscan period 46. The overscan waveform is added to the conventional sawtooth by adder means 56, whereby the resulting modified sawtooth waveform of FIG. 6C is provided at output 40' of FIG. 5. The waveforms of FIGS. 2E and 6C are similar.

FIG. 7 illustrates an alternate circuit for generating conventional horizontal sawtooth waveforms, and is usually employed with less sofisticated television cameras. The conventional portion of the circuit includes, for example, a conventional DC voltage applied to an inductor 60 via an input 62. The other end of inductor 60 is coupled to ground via switch means 64 and a parallel diode 66. The switch means is cycled, for example, via H drive or control 68. The application of the DC voltage to the inductor 60 during the active picture while switch means is open, generates a conventional horizontal ramp waveform and, when the switch means is closed generates a flyfack ramp, at output 70.

In accordance with the invention, a horizontal DC voltage pulse, such as the H blanking pulse, is superimposed on the DC voltage on the inductor 60 output via an overscan input 72. The sum of the waveforms essentially generates the modified waveform depicted in either FIG. 2E or 6C, and provides the corresponding increase in beam scan velocity during the blanking interval.

What is claimed:

1. A circuit for minimizing edge hooking in a photoelectric tube having a scanning electron beam and a scanned active picture area within a non-scanned tube target area, wherein the scanning electron beam describes a horizontal and vertical scan raster across the active picture area in response to means for generating horizontal and vertical sawtooth waveforms, comprising the combination of;
    overscan voltage means integral with the means for generating sawtooth waveforms for selectively increasing the velocity of the electron beam scan only during the horizontal and vertical blanking intervals.

2. The circuit of claim 1 wherein;
    the overscan voltage means applies a selected voltage waveform to the sawtooth waveforms during the conventional horizontal and vertical blanking pulse intervals to provide the selective increase in velocity of scan during the respective horizontal and vertical blanking intervals.

3. The circuit of claim 2 wherein;
    the scan velocity during the blanking interval is greater than the scan velocity during the active picture interval.

4. The circuit of claim 3 wherein the overscan voltage means includes;
    means for supplying DC pulses to the means for generating the sawtooth waveforms during the respective blanking intervals to increase the slope of the waveform during these intervals.

5. The circuit of claim 4 wherein the overscan voltage means includes;
    a selected resistance coupled to the input of the means for generating the sawtooth waveforms; and
    DC pulse generating means coupled to the resistance and responsive to the horizontal and vertical blanking pulses.

6. The circuit of claim 4 wherein the overscan voltage means includes;
    a waveform generator responsive to the blanking pulses; and
    adder means coupled to the waveform generator and to the means for generating the sawtooth waveforms.

7. The circuit of claim 6 wherein;
    the waveform generator includes means for supplying a sinewave of selected configuration to the sawtooth waveform during the blanking interval to increase the velocity of the beam scan during the interval.

8. A method for minimizing edge hooking in a photoelectric tube having a scanning electron beam and a scanned active picture area within a non-scanned tube target, wherein charge buildup in the non-scanned portion circumjacent the scanned active picture area causes charge bleeding from the former into the latter, comprising the steps of;
    generating horizontal and vertical sawtooth waveforms in response to a respective DC input voltage; and
    adding additional overscan voltage to the sawtooth waveforms during respective blanking intervals to selectively increase the slope of the sawtooth ramp during the blanking interval.

9. The method of claim 8 wherein the step of adding further comprises;
    applying blanking pulses to the DC input pulses in symmetry therewith to provide the increase in slope.

10. The method of claim 8 wherein the step of adding further comprises the steps of;
    producing selected DC pulses corresponding to the overscan voltages during the respective horizontal and vertical blanking intervals;
    applying the selected DC pulses to the respective DC input voltage to provide the increase in slope during the blanking intervals.

11. The method of claim 8 wherein the step of adding further comprises the steps of;
    producing selected voltage sinewaves corresponding to the overscan voltages during the respective horizontal and vertical blanking intervals; and
    adding the selected voltage sinewaves to respective horizontal and vertical sawtooth waveforms during the blanking intervals to provide the increase in slope.

* * * * *